Figure 1:
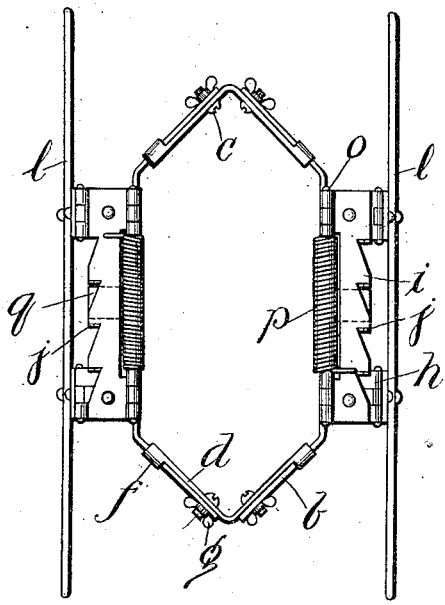

C. F. SCHEPMANN.
CATTLE POKE.
APPLICATION FILED JAN. 7, 1911.

1,004,914.

Patented Oct. 3, 1911.

Witnesses
J. Dodge

Inventor
Christian F. Schepmann,
by his Attorneys

UNITED STATES PATENT OFFICE.

CHRISTIAN F. SCHEPMANN, OF ELLIS, KANSAS.

CATTLE-POKE.

1,004,914.  Specification of Letters Patent.  Patented Oct. 3, 1911.

Application filed January 7, 1911. Serial No. 601,461.

*To all whom it may concern:*

Be it known that I, CHRISTIAN F. SCHEPMANN, a citizen of the United States, residing at Ellis, in the county of Ellis and State of Kansas, have invented certain new and useful Improvements in Cattle-Pokes; and I do hereby declare the following to be a full, clear, and exact description of the invention, such as will enable others skilled in the art to which it appertains to make and use the same.

This invention relates to improvements in animal-pokes which are applied to the necks of animals for providing effective means to prevent same from passing through or tearing down the fences of their inclosures.

The object of the invention is to provide an animal-poke which is easily adjusted to the necks of different sized animals and in which pricking means are pivotally arranged to engage the animal's neck proportionate to the violence of the attack made on the fence.

In order that the invention may be understood, the same will be hereinafter fully described, reference being had to the accompanying drawings illustrating the preferred embodiment of the invention, and the novel features thereof particularly pointed out in the appended claims.

In the drawings like characters of reference indicate corresponding parts.

Figure 2:
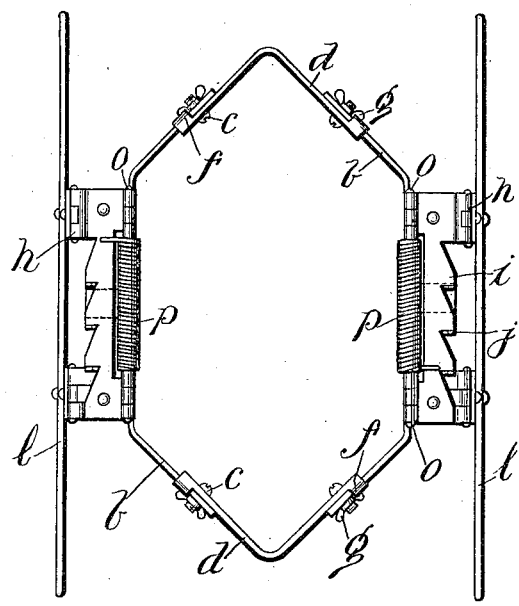
Figure 3:
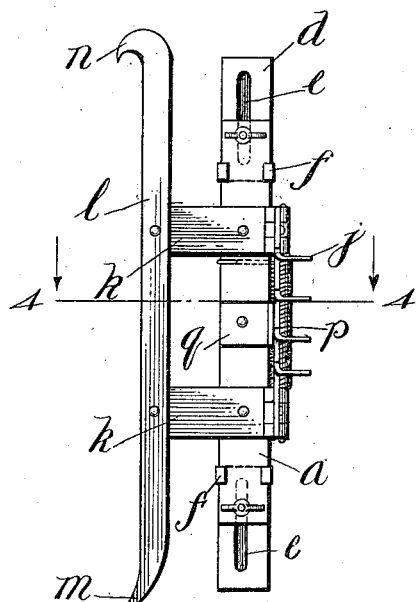
Figure 4:
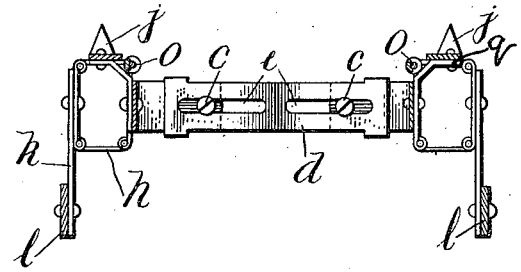

Figure 1 is a rear view of an animal-poke embodying my invention. Fig. 2 is a similar view, the collar being shown in its extended position. Fig. 3 is a side elevation of Fig. 1, and Fig. 4 is a horizontal section taken on line 4—4 of Fig. 3.

Referring to the drawings, a collar for embracing the neck of the animal consists of flat side bars $a$ having inwardly bent end portions $b$, which are provided with apertures for receiving bolts $c$. The upper and also lower end portions of the side bars $b$ are connected together by means of angular-shaped bars $d$ of flat material which are slidably arranged on the inner sides thereof and provided with elongated slots $e$ for receiving the bolts $c$. The ends of the angular-shaped bars carry inwardly turned clips $f$ which telescopically engage the end portions $b$ and hold the bars in alinement. The bolts $c$ are provided with winged nuts $g$ which secure the bars in adjusted position.

Secured to each of the side bars $b$ of the collar are upper and lower rectangular-shaped members $h$ formed of vertically arranged plates hingedly connected at their corners for a purpose presently explained. Fastened to the rear plates of each upper and lower member $h$ are prick bars $i$ having cut from their outer edges a plurality of prickers $j$ which extend rearwardly. Secured to the outer plates of each upper and lower member $h$ and extending forwardly therefrom are arms $k$ which carry contact bars $l$ having lower tapered inwardly curved ends $m$ and upper hook-shaped ends $n$. The inner rear corners of each upper and lower member $h$ are preferably connected by pivot rods $o$ on which are coil springs $p$, one of the free ends of which engage the side bars $b$ of the collar and their other ends press against the prick bars $i$ for the purpose of holding same against stops $q$ projecting laterally from the side bars $a$.

From the foregoing it is apparent that when the contact bars are pressed or abutted against a fence, the hingedly connected rectangular-shaped members will operate to turn the prickers carried thereby inwardly to engage the neck of the animal.

It is to be understood that slight changes in the form, proportion and minor details of construction may be resorted to without departing from the spirit of the invention.

Having fully described my invention what I claim is:—

1. In an animal-poke, the combination of a collar, members formed by a plurality of vertically arranged plates hingedly connected together at their adjacent ends and attached to the collar, means for holding the inner sides of the plates of the members in normal spaced relation, contact arms extending forwardly from said members, and prickers on the rear portions of said members for engaging the animal when pressure is exerted on said contact bars, substantially as described.

2. In an animal-poke, the combination of an adjustable collar formed of flat side bars having inwardly turned end portions, means for slidably connecting the adjacent end portions of the side bars together, members formed by a plurality of vertically arranged plates having their adjacent ends hingedly connected together and carried by the side bars, means for holding the inner faces of the plates of the members in normal spaced relation, contact arms extending forwardly from said members, and prickers on said members for engaging the animal when pressure is exerted on said contact bars, substantially as described.

3. In an animal-poke, the combination of an adjustable collar formed of flat side bars having inwardly turned end portions, angular-shaped bars of flat material having inwardly turned clips for telescopically receiving the end portions of the side bars, means for holding the angular-shaped bars and the end portions of the side bars in adjusted position, upper and lower members composed of a plurality of plates hingedly connected at their ends and carried by the side bars, means for holding the inner faces of the plates of the members in normal spaced position, contact arms extending forwardly from said members, prick bars secured to the rear portion of each upper and lower member, and prickers integral with the prick bars, substantially as described.

4. In an animal-poke, the combination of an adjustable collar formed of flat side bars having inwardly turned end portions, angular-shaped bars of flat material having inwardly turned clips for telescopically receiving the end portions of the side bars, means for holding the angular-shaped bars and the end portions of the side bars in adjusted position, upper and lower members composed of a plurality of plates hingedly connected at their ends and carried by the side bars, arms projecting forwardly from said members and supporting contact bars, prick bars secured to the rear portion of each upper and lower member, prickers integral with the prick bars, and means for holding the opposite plates of said members in normal spaced position, substantially as described.

5. In an animal-poke, the combination of an adjustable collar formed of flat side bars having inwardly turned end portions, angular-shaped bars of flat material having inwardly turned clips for telescopically receiving the end portions of the side bars, means for holding the angular-shaped bars and the end portions of the side bars in adjusted position, upper and lower members composed of a plurality of plates hingedly connected at their ends and carried by the side bars, arms projecting forwardly from said members and supporting contact bars, prick bars secured to the rear portion of each upper and lower member, stickers on the outer edges of the prick bars and integral therewith, stops on the side bars, pivot rods connecting the rear inner corners of each upper and lower member, and coil springs on the rods having their free ends engage the side bars and prick bars tending to hold the latter against said stops, substantially as described.

In testimony whereof, I affix my signature, in presence of two witnesses.

CHRISTIAN F. SCHEPMANN.

Witnesses:
 FRED OHLEMEER,
 ARTHUR FANTEMO.

---

Copies of this patent may be obtained for five cents each, by addressing the "Commissioner of Patents, Washington, D. C."